United States Patent [19]

Gaku et al.

[11] 4,410,601
[45] Oct. 18, 1983

[54] COLLOIDAL SOLUTIONS, PROCESSES FOR PRODUCING THE SAME AND USES THEREOF

[75] Inventors: Morio Gaku, Showamachi; Nobuyuki Ikeguchi; Hidenori Kimbara, both of Tokyo, all of Japan

[73] Assignee: Mitsubishi Gas Chemical Company, Inc., Tokyo, Japan

[21] Appl. No.: 332,878

[22] Filed: Dec. 21, 1981

[30] Foreign Application Priority Data

Dec. 23, 1980 [JP] Japan ............... 55-182642
Jul. 7, 1981 [JP] Japan ............... 56-106005

[51] Int. Cl.³ ............... C08J 3/08
[52] U.S. Cl. ............... 428/290; 523/440; 523/454; 523/455; 523/456; 523/461; 523/462; 523/463; 523/508; 523/511; 523/513; 523/517; 523/518; 524/99; 524/113; 524/205; 524/259; 524/315; 524/356; 524/366; 524/539; 524/541; 524/571; 524/593; 524/611; 524/612; 524/923
[58] Field of Search ............... 524/571, 611, 612, 99, 524/113, 205, 259, 315, 356, 366, 539, 541, 593, 923; 260/326.26; 428/290; 523/424, 440, 454, 455, 456, 461, 462, 463, 508, 511, 513, 517, 518

[56] References Cited

FOREIGN PATENT DOCUMENTS

| 47-1606 | 5/1972 | Japan | ............... 548/521 |
| 52-24547 | 7/1977 | Japan . | |
| 52-47796 | 12/1977 | Japan . | |
| 53-5920 | 3/1978 | Japan . | |
| 53-6040 | 3/1978 | Japan . | |
| 53-24640 | 7/1978 | Japan . | |
| 54-16976 | 6/1979 | Japan . | |
| 508501 | 3/1976 | U.S.S.R. | ............... 548/521 |

*Primary Examiner*—Allan Lieberman
*Attorney, Agent, or Firm*—Fleit, Jacobson, Cohn & Price

[57] ABSTRACT

A process for producing a colloidal solution of a curable resin which comprises:

blending (a) 5 to 90% by weight of a polyfunctional maleimide component and (b) 95 to 10% by weight of at least one thermosetting resin, heating them to form a composition, and blending the resulting composition with at least one low boiling point solvent having a boiling point of more than room temperature and less than 150° C., in which the thermosetting resin is rich soluble, but the maleimide component is poor soluble, thereby forming a colloidal solution of a curable resin is disclosed. The colloidal solution is used as a coating, as an impregnating agent for a coil, or for preparing prepreg.

11 Claims, No Drawings

COLLOIDAL SOLUTIONS, PROCESSES FOR PRODUCING THE SAME AND USES THEREOF

BACKGROUND OF THE INVENTION

This invention relates to a process for producing a colloidal solution of a curable resin containing a polyfunctional maleimide component. This invention also relates to a colloidal solution of a curable resin which can be used as a coating, as an impregnating agent for a coil, such as an electrical coil, or for preparing prepreg.

In the prior art, since cured products obtained by curing curable resin compositions containing a polyfunctional meleimide component have heat resistance, use of the curable resin compositions as an insulating material has been considered. However, curable resin compositions containing a polyfunctional maleimide component are poor soluble in most organic solvents. Limited high boiling point solvents, such as N-methyl-2-pyrrolidone (boiling point of 204° C.) or dimethylformamide (boiling point of 153° C.) have been used as a solvent for dissolving such curable resin compositions containing a polyfunctional maleimide component. Low boiling point solvents may be used together with high boiling point solvents, or may be used as a resin solution having a concentration of as low as 30%.

For example, use of high boiling point solvents as a solvent for curable resin composition are disclosed in Japanese Patent Publication (Kokoku) Nos. 24547/1977, 47796/1977, 5920/1978 6040/1978, 24640/1978 and 16976/1979.

When a resin solution containing a high boiling point solvent is used as a coating, as an impregnating agent for electrical coil or for preparing prepreg, followed by drying the resin solution at room or high temperature, the high boiling point solvent used in the resin solution can not be completely removed from the finished product by such drying step. In other words, even though the finished product containing the high boiling point solvent is dried at an elevated temperature or room temperature, some of the high boiling point solvent is likely to remain in the product. When any high boiling point solvent remains in the product, the product tends to blister during processing of the product at an elevated temperature. In addition, the product containing the solvent has poor mechanical properties.

As mentioned above, when a low boiling point solvent is used for dissolving curable resin, a resin solution of only low concentration can be obtained, because of low solubility of the resin in the low boiling point solvent. However when the resin solution having low concentration of resins is used as for coating, impregnating a coil, such as an electrical coil or for preparing prepreg in one stage, amount of resin coated or impregnated is not sufficient, so such solution is not practical.

SUMMARY OF THE INVENTION

The present inventors carried out research for increasing the amount of coating or the impregnation of curable resin containing a polyfunctional maleimide component on or in a reinforcing material, a substrate or a coil without employing any high boiling point solvents. As a result, we found that the above shortcomings of prior art high boiling point solvents can be overcome by using specific solvents.

Therefore, one object of this invention is to provide a process for producing a solution of curable resin containing a polyfunctional maleimide component by using low boiling point solvents.

Another object of this invention is to provide a process for producing a solution of curable resin containing a polyfunctional maleimide component, which makes possible transferring a great amount of resin to a substrate and which does not leave large amount of solvent in the finished product.

This invention relates to a process for producing a colloidal solution of a curable resin which comprises:

blending (a) 5 to 90% by weight of a polyfunctional maleimide component and (b) 95 to 10% by weight of at least one thermosetting resin, heating them to form a composition, the composition including a mixture of components (a) and (b), a preliminary reaction product of components (a) and (b), or the combination of said mixture and said preliminary reaction product, and blending the resulting composition with at least one low boiling point solvent having a boiling point of more than room temperature and less than 150° C., preferably 35°–140° C., in which the thermosetting resin is rich soluble, but the maleimide component is poor soluble, thereby forming a colloidal solution of curable resin.

This invention also relates to a process for producing a colloidal solution of a curable resin which comprises:

blending (a) 5 to 90% by weight of a polyfunctional maleimide component and (b) 95 to 10% by weight of at least one thermosetting resin, heating them to form a composition, the composition including a mixture of components (a) and (b), a preliminary reaction product of components (a) and (b), or the combination of said mixture and said preliminary reaction product, blending the resulting composition with at least one low boiling point solvent having a boiling point of more than room temperature and less than 150° C., preferably 35°–140° C., in which the thermosetting resin is rich soluble, but the maleimide component is poor soluble, thereby forming the colloidal solution of a curable resin, and adding to the colloidal solution a solution of the thermosetting resin and/or prepolymer thereof in a low boiling point solvent having a boiling point of less than 150° C.

DETAILED DESCRIPTION OF THE INVENTION

By "a thermosetting resin is rich soluble in a solvent" in the specification and the claims is meant that more than 100 parts by weight of a thermosetting resin is soluble in 100 parts by weight of a solvent at room temperature.

By "a polyfunctional maleimide component is poor soluble in a solvent" in the specification and the claims is meant that less than 67 parts by weight of a polyfunctional maleimide component is soluble in 100 parts by weight of a solvent at room temperature and preferably less than 34 parts by weight of a polyfunctional maleimide component is soluble in 100 parts by weight of a solvent at room temperature.

The polyfunctional maleimides employed in the present invention are organic compounds having two or more maleimide groups derived from maleic anhydride and a polyamine and are represented by the following general formula:

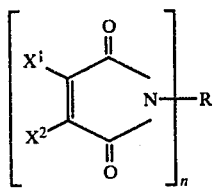

wherein R represents divalent to pentavalent aromatic or alicyclic organic group, each of $X^1$ and $X^2$ represent a hydrogen atom, halogen atom or alkyl group, and n represents an integer of from 2–5.

The maleimides represented by the above formula can be produced by a method known per se which involves reacting maleic anhydride with divalent or more polyamine to form a maleamide acid, and then dehydro-cyclizing the maleimide acid. The maleimide can be produced by known methods per se.

Aromatic amines are preferable as the starting polyamines, because the resulting object resin has excellent properties, such as heat-resistance, etc. However, if it is desired that the resulting object resins have only flexibility and pliability, alicyclic amine alone or combination of the alicyclic amines and other amines may be used. Though secondary amines can be used as the starting amine, the primary amines are preferable. Examples of the amines include meta- or paraphenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, bis(4-amino-3-chlorophenyl)methane, 2,2-bis(3,5-dibromo-4-aminophenyl)propane, bis(4-aminophenyl)-phenylmethane, 3,4-diaminophenyl-4'-aminophenylmethane and 1,1-bis(4-aminophenyl)-1-phenylethane, melamines having s-triazine ring, and addition product of formalin and an aniline in which two or more aniline benzene rings bond through methylene group.

Examples of polyfunctional maleimide include 1,3- or 1,4-dimaleimide benzene, 1,3- or 1,4-bis(maleimide methylene)benzene, 1,3- or 1,4-dimaleimide cyclohexane, 1,3- or 1,4-bis(maleimidemethylene)cyclohexane 4,4'-dimaleimide biphenyl, bis(4-maleimidephenyl)methane, bis(4-maleimidephenyl)ether, bis(4-maleimidephenyl)sulfone, bis(4-maleimide-3-methylphenyl)methane, bis(4-maleimide-3-chlorophenyl)methane, bis(4-maleimide-3,5-dimethylphenyl)methane, 2,2-bis(4-maleimide-3-methylphenyl)propane, 2,2-bis(4-maleimide-3,5-dibromophenyl)propane, bis(4-maleimidephenyl)-phenylmethane, 3,4-dimaleimidephenyl-4'-maleimidephenylmethane, 1,1-bis(4-maleimidephenyl)-1-phenylmethane, and maleimides derived from melamine and addition product of formalin and an aniline in which two or more aniline benzene rings bond through methylene group.

The polyfunctional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

By "polyfunctional maleimide component" in the specification and the claims is meant at least one compound selected from the group consisting of
(i) a polyfunctional maleimide,
(ii) a prepolymer of (i) and
(iii) a coprepolymer of (i) and an amine Examples of the thermosetting resins employed in the practice of the present invention include epoxy resins, such as bisphenol A type epoxy resin, bisphenol F type epoxy resin, phenolic novolak type epoxy resin, cresylic novolak type epoxy resin, alicyclic epoxy resin and hydantoin epoxy resin; cyanate resins having one or more $-\!(\!O\!-\!C\!\equiv\!N)$ group in its molecule, such as bisphenol A type cyanate resin, phenolic novolak type cyanate resin, and alicyclic cyanate resin; esters of polyhydric alcohols and acrylic acid or methacrylic acid, phenol resins, such as novolak type phenol resin, or resol type phenol resin; isocyanate compounds; unsaturated polyester resins; diallyl phthalate resins; polyurethanes; and 1,2-polybutadiene resins and liquid 1,2-polybutadiene rubbers, such as 1,2-polybutadiene, epoxidized 1,2-polybutadiene, malein-modified 1,2-polybutadiene and isocyanate-modified 1,2-polybutadiene, and mixtures thereof.

The thermosetting resins include, for example monomers constituting the above compounds and prepolymers or preliminary reaction products of the monomers.

It is critical that the low boiling point solvent employed in the present invention have a boiling point of more than room temperature and less than 150° C., preferably 35°–140° C., and that it be one in which the thermosetting resin is rich soluble, but the maleimide is poor soluble. Such solvent is referred to as low boiling point solvent hereinunder. Examples of such low boiling point solvents include ketones, such as acetone, methyl ethyl ketone, methyl isobutyl ketone and 3-pentanone; aromatic hydrocarbons, such as benzene, toluene and xylene; aliphatic hydrocarbons, such as n-pentane and n-hexane; halogenated hydrocarbons, such as chloroform or methylene chloride; alcohols, such as methanol and ethanol; esters, such as ethyl formate, propyl formate, ethyl acetate, propyl acetate and butyl acetate; derivatives of glycols, such as ethylene glycol monomethyl ether, ethylene glycol dimethyl ether, propylene glycol diethyl ether, propylene glycol dimethyl ether and propylene glycol monomethyl ether; nitrogen-containing compounds, such as nitro methane, acetonitrile and pyridine; tetrahydrofuran; dioxane and water. The solvent may be used alone or as mixture thereof.

Choice of the solvent or solvents is determined by the thermosetting resins employed.

The solvent or solvents is used in such as amount that not all the amount of the polyfunctional maleimide component employed is dissolved therein at room temperature.

The low boiling point solvent may be added just after a polyfunctional maleimide component is blended with a thermosetting resin while heating and when the temperature is still high. Alternatively, after a polyfunctional maleimide component and a thermosetting resin are blended while heating, and the resulting composition is cooled to room temperature, the low boiling point solvent may be added to the resulting composition.

In the former method, after the low boiling point solvent is added to the resulting composition, the polyfunctional maleimide component is likely to separate out from the solution during cooling step of the composition. In order to avoid this shortcoming, it is necessary that the mixture of the composition and the low boiling point solvent be stirred throughout the step so as to form a colloidal solution containing finely divided particles.

In the latter method, after the composition is cooled to room temperature, the low boiling point solvent is blended with the cooled composition. In this method, it is preferable to agitate the solution during the cooling step. If it is desired to accelerate the forming of a colloidal solution, the solvent may be blended with the composition while heating them.

When a low boiling point solvent is blended with the composition containing 5-30 wt% of polyfunctional maleimide component, particularly 5-20 wt% of a polyfunctional maleimide component at an elevated temperature, a supersaturated solution of the resin is formed even after cooling the resulting mixture to room temperature. In storage of the supersaturated solution of the resin, the polyfunctional maleimide component therein gradually deposits on the bottom and side walls of the container, and the deposit adheres thereto. This is not desirable. Whether or not a supersaturated solution of a resin is formed depends on the kinds of low boiling point solvents used. In order to avoid formation of a supersaturated resin solution, the resin solution is cooled to a temperature below room temperature, for example a temperature below 0° C. to form a colloidal solution, and then the colloidal solution is heated to room temperature.

Alternatively, a low boiling point solvent is blended with the composition containing more than 20 wt% of polyfunctional maleimide component, preferably more than 30 wt% of polyfunctional maleimide component, followed by cooling the mixture to room temperature to form a colloidal solution. A low boiling point solvent is blended with a thermosetting resin not containing a polyfunctional maleimide component to form a resin solution in which the resin is completely dissolved. The resin solution is blended with the colloidal solution.

According to this method, a colloidal solution of a curable resin which does not cause deposit of a polyfunctional maleimide component on bottom and side walls of the container during storage can be prepared from a composition containing low concentration of a polyfunctional maleimide component.

Sometimes, when a colloidal solution of a curable resin prepared according to the present invention has low concentration of resin, there are instances where the resin particles settle out during storage. A colloidal resin solution can be prepared by conventionally stirring the resin solution in which the resin particles have settled out.

When a colloidal solution of a curable resin containing less than 30 wt% of a polyfunctional maleimide component, particularly less than 20 wt% of a polyfunctional maleimide component is heated, the dispersed particles are dissolved in the low boiling point solvent to form a clear solution of the resin. The hot clear solution of curable resin can be used as a coating, as an impregnating agent or for preparing prepreg. Even if the hot clear solution is cooled to room temperature, the maleimide component does not deposit on the container wall soon. So, the solution can be used for a certain period after it has been cooled to room temperature on the condition that the period is not very long. In addition, other thermosetting resins or other thermosetting resin compositions having good solublity may be added to a colloidal solution of a curable resin prepared according to the present invention, or an additional low boiling point solvent may be added to the colloidal solution, and a clear solution of the resin can be formed by heating the resulting solution or without heating the resulting solution. In other words, other thermosetting resin or thermosetting resin composition, or an additional low boiling point solvent may be added to a colloidal resin solution to form a clear resin solution.

A colloidal solution of a curable resin prepared according to the present invention may be used as a coating, as an impregnating agent for a coil, such as an electrical coil or for preparing prepreg in the same way as in the case of using a clear varnish in which a resin component is dissolved completely.

In case of using the colloidal solution of a curable resin for preparing prepreg, the colloidal solution is coated on or impregnated in a reinforcing material, followed by heating the material to obtain prepreg. Examples of the reinforcing materials include glass substrates, such as glass fiber roving, needled mat, glass mat, non-woven glass fabric, and glass cloth; synthetic organic fibers, such as polyester, polyacrylate, polyamide and aromatic polyamide; natural organic substrates, such as paper, cotton and hemp; and carbon fiber substrates, such as carbon fiber and fabric made of carbon fiber. Two or more of the reinforcing materials may be used.

A process for impregnating the reinforcing material with the colloidal solution is wet process.

Since a colloidal solution having a high resin content is likely to be kept in a colloidal state for a long time, the colloidal solution may be stored until it is used. When the colloidal solution is used, it is diluted with a low boiling point solvent. There are instances where a colloidal solution having a relatively low resin content can be kept in a colloidal state for a long time. When the colloidal solution having a relatively low resin content is allowed to stand for a long time, there are instances where some of the dispersed particles contained in the colloidal solution settle out. However, the solution having settled particles becomes colloidal by stirring the solution for a short time, for example one minutes. It is preferable that the colloidal solution having a relatively low resin content as well as the colloidal solution having a high resin content be kept in a colloidal state for a long time by carrying out agitation or vibration of the solution or recycling of the solution by pump continuously or at intervals.

The colloidal solution is coated on the substrate or reinforcing material, etc. or the reinforcing material or electrical coil is impregnated with it, followed by drying the resin by heating. The drying conditions depend on the kinds of solvents used and curing characteristics of resin used. The drying conditions are milder when a low boiling point solvent is used in the colloidal resin solution, than when a high boiling point solvent is used.

As explained above, when the colloidal resin solution prepared according to the present invention is used as a coating, as an impregnating agent for coil or for preparing prepreg, the amount of volatile component remaining in the resin can be reduced, the drying time can be shortened and the drying temperature can be lowered. The colloidal solution of the present invention can be used in low concentrations and yet it assures the same amount of impregnation as that achieved by the conventional clear varnish used in high concentrations.

In general, when a clear varnish containing a high boiling point solvent is used, the drying conditions of the resin must be severe in order to remove the high boiling point solvent. The drying of the resin under severe conditions greatly increases the molecular weight of the resin. This makes the properties of the resulting prepreg worse. In order to avoid this shortcoming, a varnish containing a low molecular weight resin must be used. On the other hand, as mentioned above, when the colloidal resin of the present invention containing a low boiling point solvent is used, the drying conditions of the resin may be mild. The drying of the resin under mild conditions does not greatly increase molecular weight of the resin. So, according to the present invention, a colloidal solution containing relatively high molecular weight resin can also be used.

Further, since the drying conditions of the resin may be mild, energy can be saved to some extent. Therefore, the colloidal solution of the present invention is very practical.

The following examples and the control tests are illustrative of the present invention but are not to be construed as limiting the scope thereof in any manner. The percent and parts are by weight, unless otherwise specified.

EXAMPLE 1

400 Grams of bis(4-maleimidophenyl)methane was blended with 600 g of 2,2-bis(4-cyanatophenyl)propane while heating. The mixture was heated at 150° C. for 2 hours to preliminarily react the two components. The resulting resin composition was blended with 250 g of methyl ethyl ketone with stirring under reflux. The mixture was cooled to room temperature with stirring. The resulting resin solution was not a clear solution, but was in a colloidal state. Though the colloidal solution was stored at 25° C. for one month, hardly any dispersed particles settled out.

To the colloidal resin solution were added 0.3 g of zinc octoate and 10 g of dimethyl benzylamine. Then 850 g of acetone was added to the mixture to dilute it. Glass cloth (7628 AS-308 produced by Asahi Schmebel Co., Ltd.) was impregnated with the resulting solution and was dried at 120° C. for 6 minutes to obtain prepreg.

The resulting prepreg was uniform and had a resin content of 45% and volatile content of 0.03%.

EXAMPLE 2

600 Grams of bis(4-maleimidophenyl)methane, 360 g of bisphenol A diglycidyl ether (Epikote 828 produced by Shell Oil Co., Ltd.) and 40 g of bis(3-chloro-4-aminophenyl)methane (Cuamine MT produced by Ihara Chemical Co., Ltd.) were blended and the mixture was heated at 140° C. for 3 hours to preliminarily react the components. The resulting resin composition was blended with 667 g of toluene with stirring under reflux, and the resulting mixture was cooled to room temperature with stirring. The resulting solution was in a colloidal state. The colloidal solution was stored at 25° C. for one month. Some of the dispersed particles contained in the colloidal solution settled out, but when the solution was stirred for only one minute, the solution became colloidal.

Then 1.5 g of 2-ethyl-4-methylimidazol was added to the solution. Non-woven fabric made of glass (GMC-00050 produced by Honshu Seishi Kabushiki Kaisha) was impregnated with the solution, and was dried at 130° C. for 6 minutes to obtain prepreg. The resulting prepreg was uniform and had a resin content of 90%.

EXAMPLE 3

610 G of hexamethylene dimaleimide and 390 g of 4,4'-diaminodiphenylmethane were blended with stirring under reflux, and 430 g of dioxane was added to the mixture and the resulting mixture was cooled with stirring to obtain a colloidal resin solution. Fabric made of aromatic polyamide (Cepra produced by Du Pont) was impregnated with the colloidal solution, and dried at 150° C. for 5 minutes.

The resulting prepreg was uniform and had volatile content of 0.04%.

EXAMPLE 4

200 G of bis(4-maleimidophenyl)methane and 800 g of prepolymer of 2,2-bis(4-cyanatophenyl)propane ($\overline{Mn}$ is about 600) were blended while heating and the mixture was heated. 125 G of acetone and 125 g of meta-xylene were added to the mixture. The resulting mixture was stirred to obtain a colloidal solution. The resulting colloidal solution was diluted with acetone. Carbon fabric (Besfight 3101 produced by Toho Besron Co., Ltd.) was impregnated with the resulting solution, and dried at 140° C. for 5 minutes.

The resulting prepreg had a volatile content of 0.04%.

EXAMPLE 5

200 G of bis(4-maleimidophenyl)methane and 300 g of 2,2-bis(4-cyanatophenyl)propane were blended while heating, and immediately the mixture was cooled to obtain a resin composition. 500 G of the resulting resin composition and 500 g of the resin composition of Example 1 were blended with 429 g of methyl ethyl ketone, and the mixture was stirred at room temperature to obtain a colloidal resin solution.

0.3 G of zinc octoate and 10 g of dimethyl benzyl amine were added to the colloidal solution, and then the mixture was diluted with 700 g of acetone. The glass cloth of Example 1 was impregnated with the resulting solution, and dried at 135° C. for 6 minutes.

The resulting prepreg had uniformity, clearness, toughness and flexibility, and had a resin content of 43% and a volatile content of 0.03%.

EXAMPLE 6

300 G of bis(4-maleimidophenyl)methane, 700 g of 2,2-bis(4-cyanatophenyl)propane and 25 g of novolak type epoxy resin (Epikote 152 produced by Shell Oil Co., Ltd.) were blended while heating, and the components were preliminarily reacted at 140° C. for 2 hours. Then 256 g of methyl ethyl ketone was added to the mixture, and the resulting mixture was cooled with stirring to room temperature to obtain a colloidal resin solution. The colloidal solution is referred to as solution A.

1000 G of 2,2-bis(4-cyanatophenyl)propane and 25 g of novolak type epoxy resin (Epikote 152 produced by Shell Oil Co., Ltd.) were blended while heating, and the components preliminarily reacted at 150° C. for 4 hours. Then 256 g of methyl ethyl ketone was added to the mixture. The resulting mixture was cooled with stirring to room temperature to obtain a clear resin solution. The solution is referred to as solution B.

Solution A and solution B were blended at room temperature in a ratio of 1:2, 1:1 or 2:1. In all cases, colloidal solutions were formed. After the three colloidal solutions had stood for one month at 25° C., hardly any dispersed particles had settled out.

EXAMPLE 7

0.02 G of iron acetyl acetonate was added as a catalyst to 125 g of the colloidal resin solution of Example 4. The mixture was diluted with 200 g of acetone. The resulting solution was coated on an aluminum plate so as to obtain a coating layer 20 micron thick and air-dried for 10 minutes and then heated at 100° C. for 3 minutes.

The resulting coating was not tacky.

Control Test 1

The procedure of Example 1 was repeated except that dimethyl formamide was used in place of methyl ethyl ketone. The resulting resin solution was clear and was one in which the resin component dissolved.

The resulting prepreg had a volatile content of 0.14%. In order to reduce the volatile content to the level of Example 1 within 6 minutes, the prepreg had to be dried at a temperature of more than 160° C. However, the resin gels when drying is carried out at such a high temperature, so a good prepreg can not be obtained.

Control Test 2

The procedure of Example 2 was repeated except that 2333 g of dioxane was used in place of 667 g of toluene to form a varnish having a concentration of 30% in which the resin components are completely dissolved in the solvent. The resulting solution was clear and was one in which the resin component dissolved. Resin content of the resulting prepreg was only 53%.

Control Test 3

The procedure of Example 3 was repeated except that N-methyl-2-pyrrolidone was used in place of dioxane. The resulting solution was clear and was one in which the resin component dissolved. The resulting prepreg had a volatile content of 0.24%.

In order to reduce the volatile content to the level of Example 3, the prepreg had to be dried at 170° C. for more than 6 minutes. The resin gels at such a high temperature, so a good prepreg can not be obtained.

Control Test 4

The procedure of Example 4 was repeated except that 667 g of N-methyl-2-pyrrolidone was used in place of acetone and metaxylene. The resulting solution was clear and was one in which the resin component dissolved.

The resulting solution was coated on an aluminum plate in the same way as in Example 7. The resulting coating was tacky.

What is claimed is:

1. A process for producing a colloidal solution of a curable resin which comprises:
blending (a) 5 to 90% by weight of (i) a polyfunctional maleimide component represented by the following general formula

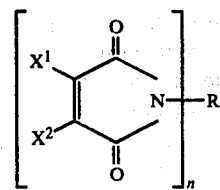

wherein R represents a divalent to pentavalent aromatic or a bicyclic organic group, each of X1 and X2 represents a hydrogen atom, halogen atom or alkyl groups, and M represents an integer of 2-5, (ii) a prepolymer of (i) or (iii) a coprepolymer of (i) and an amine, and (b) 95 to 10% by weight of at least one thermosetting resin, heating them to form a composition, the composition including a mixture of components (a) and (b), a preliminary reaction product of components (a) and (b), or the combination of said mixture and said preliminary reaction product, and blending the resulting composition with at least one low boiling point solvent, wherein the solvent or solvents is used in such an amount that not all the amount of the polyfunctional maleimide component is dissolved therein at room temperature, has a boiling point of more than room temperature and less than 150° C., and has solubility characteristics such that more than 100 parts by weight of the thermosetting resin and less than 67 parts by weight of the polyfunctional maleimide component are soluble in 100 parts by weight of said solvent or solvents at room temperature, thereby forming a colloidal solution of curable resin.

2. The process of claim 1 further including the step of adding to said colloidal solution a solution of the thermosetting resin and/or prepolymer thereof in a low boiling point solvent having a boiling point of more than room temperature and less than 150° C.

3. The process as defined in claim 1 wherein the thermosetting resin is selected from the group consisting of bisphenol A type epoxy resin, bisphenol F type epoxy resin, phenolic novolak type epoxy resin, cresylic novolak type epoxy resin, alicyclic epoxy resin, hydantoin epoxy resin, bisphenol A type cyanate resin, phenolic novolak type cyanate resin, alicyclic cyanate resin, esters of polyhydric alcohols and acrylic acid or methacrylic acid, phenol novolak type phenol resin, resol type phenol resin; isocyanate compounds, unsaturated polyester resins diallyl phthalate resins, polyurethanes, polybutadiene resins, 1,2-polybutadiene, epoxidized 1,2-polybutadiene, malein-modified 1,2-polybutadiene, isocyanate-modified 1,2-polybutadiene, and mixtures thereof.

4. The process as defined in claim 1 wherein the low boiling point solvent is selected from the group consisting of acetone, methyl ethyl ketone, 3-pentanone, methyl isobutyl ketone, benzene, toluene, xylene, n-pentane, n-hexane, methylene chloride, methanol, ethanol, ethyl formate, propyl formate, ethyl acetate, propyl acetate, butyl acetate, ethylene glycol monomethyl ether, ethylene glycol dimethyl ether, propylene glycol monoethyl ether, propylene glycol dimethyl ether, propylene glycol monomethyl ether, nitro methane, acetonitrile pyridine, tetrahydrofuran, dioxane, water and mixtures thereof.

5. A method of coating which comprises the application of the product produced by the process of claim 1.

6. A method of impregnating a coil which comprises impregnation with the product produced by the process of claim 1.

7. A method of forming a prepreg which comprises application of the product produced by the process of claim 1 to a reinforcing material.

8. The colloidal solution produced by the process of claim 1.

9. A coating produced by the application to a substrate of the colloidal solution produced by the process of claim 1.

10. An electrical coil impregnated with the colloidal solution produced by the process of claim 1.

11. A prepreg comprising a reinforcing material impregnated with the colloidal solution produced by the process of claim 1.

* * * * *